G. CAPRONI.
FLYING MACHINE.
APPLICATION FILED JAN. 3, 1916.

1,284,590.

Patented Nov. 12, 1918.
2 SHEETS—SHEET 1.

INVENTOR
Gianni Caproni
By Wheatly & Mackenzie
Attorneys.

G. CAPRONI.
FLYING MACHINE.
APPLICATION FILED JAN. 3, 1916.
1,284,590.
Patented Nov. 12, 1918.
2 SHEETS—SHEET 2.
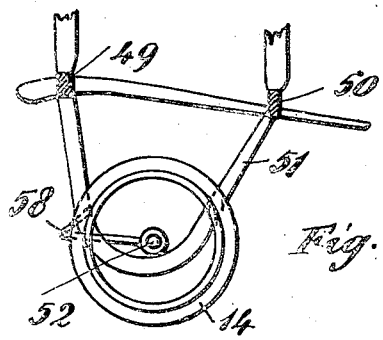
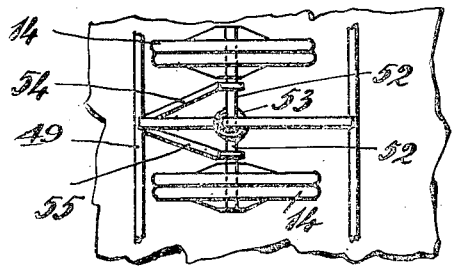
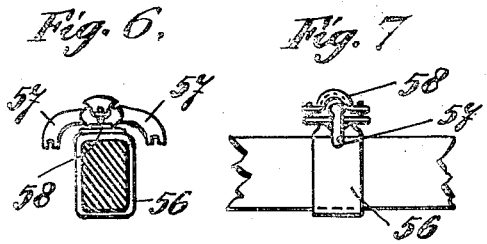
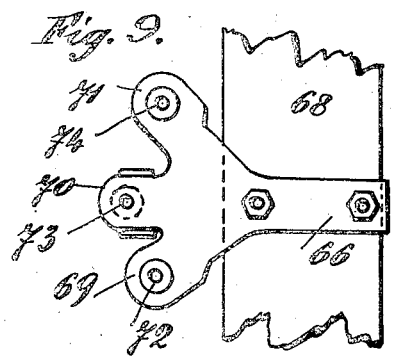
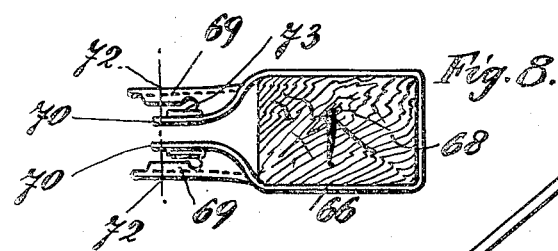
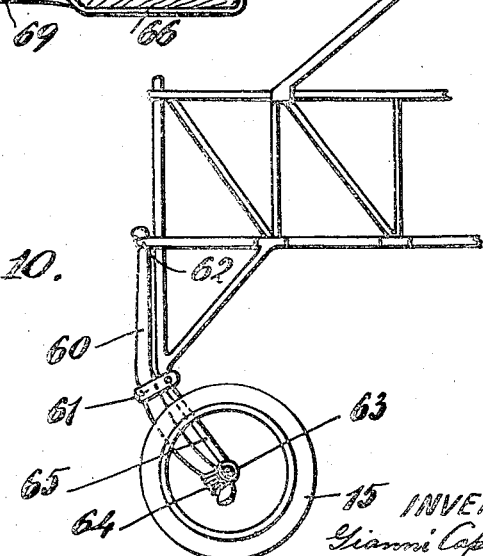
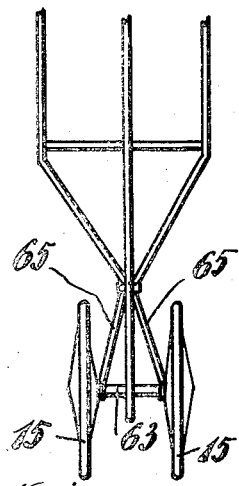
INVENTOR
Gianni Caproni
By Wheatly & Mackenzie
Attorneys

UNITED STATES PATENT OFFICE.

GIANNI CAPRONI, OF MILAN, ITALY.

FLYING-MACHINE.

1,284,590.      Specification of Letters Patent.      Patented Nov. 12, 1918.

Application filed January 3, 1916. Serial No. 70,030.

*To all whom it may concern:*

Be it known that I, GIANNI CAPRONI, subject of the Kingdom of Italy, residing at 28 Via S. Gregorio, Milan, Italy, have invented certain new and useful Improvements in Flying-Machines, of which the following is a specification.

This invention relates to aeroplane flying machines and particularly to aeroplanes having two fuselages independent of one another and a plurality of motors and propellers or tractors and has for its object to construct a powerful machine having three motors, to provide for a more effective application of the motive power to the propellers or tractor screws, and generally to construct the main frame and chassis of the machine in such manner that they can safely take the additional stresses to which a machine of this type is subjected.

With the above objects in view the invention comprises a plurality of superposed main lifting planes, a main transverse front frame connecting said main lifting planes, a plurality of fuselages connected at their forward ends with the main frame and symmetrically disposed on opposite sides of the center line of the machine, rear stabilizing means connected with the rear ends of the fuselages, steering and controlling means, a body or nacelle disposed in the main transverse front frame between the fuselages, a motor mounted in the forward end of each fuselage, a plurality of tractor propellers driven directly by said motors, a third motor and propeller mounted on the body or nacelle, and a landing chassis or carriage.

The invention further comprises improved means for connecting the struts or uprights and stays of the main frame with the spars of the main planes, and an improved construction of landing carriage hereinafter more fully described and defined in the claims.

A flying machine embodying my improvements is illustrated in the annexed drawings in which:

Figs. 4 and 5 are detail elevation and plan view respectively of part of the landing carriage.

Fig. 6 is a plan of a yoke applied to a landing carriage bracket shown in cross section.

Fig. 7 is a side elevation of the same.

Figs. 8 and 9 are detail side elevation and plan respectively of lugs employed for connecting the struts and wire stays to the spars of the main frame.

Figs. 10 and 11 illustrate further details of landing carriage construction.

Like numerals designate like parts throughout the drawing.

Figure 1:
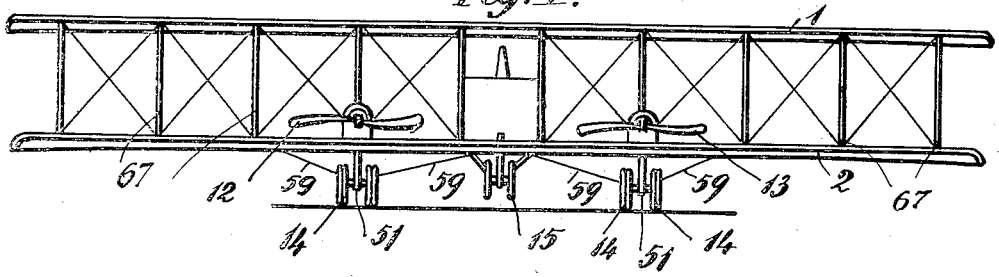
Figures 1 to 3 are a front elevation, a plan and a side elevation respectively of a biplane constructed correspondingly to the invention.
Figure 2:
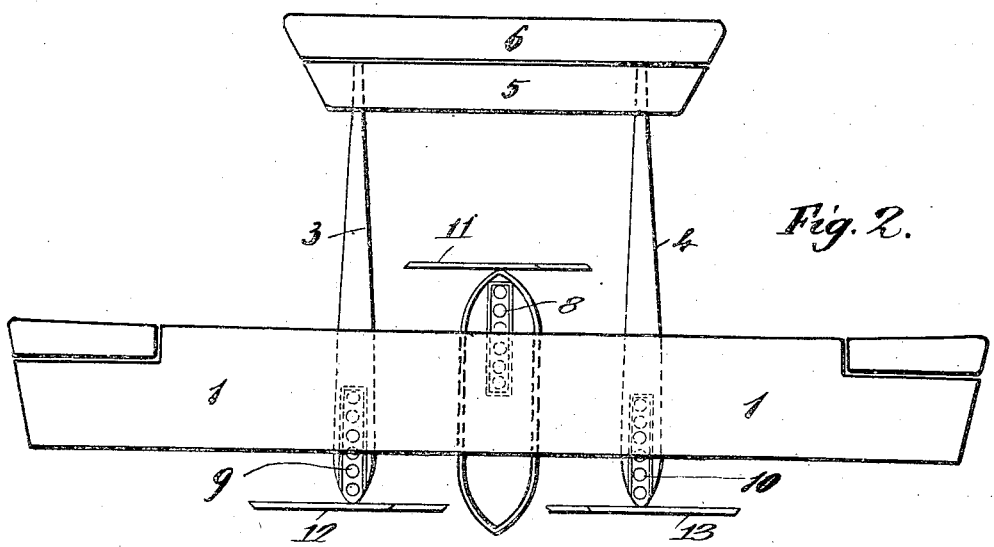
Figure 3:
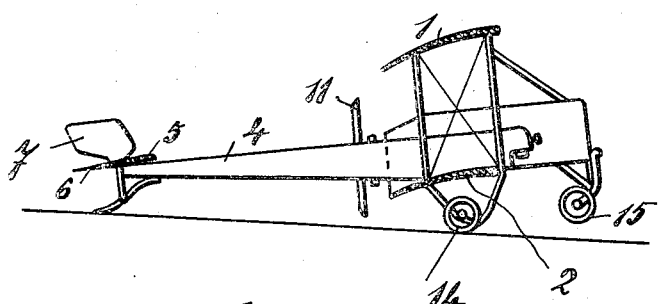

With reference to Figs. 1, 2, and 3, 1 and 2 indicate planes located at the front of the machine; 3 and 4 denote two longitudinal frames or fuselages connected at their forward ends to the frame supporting said planes 1 and 2.

Pivotally connected to the rear end of each fuselage is a vertical rudder 7. Between the rear ends of said fuselages is rigidly connected a tail plane 5; 6 denotes a horizontal rudder pivotally mounted on a transverse axis.

The under-carriage is designated by numerals 14 and 15.

The engines, three in number, are indicated at 8, 9 and 10.

The propelling system comprises three screw propellers, namely a central propeller and two side propellers. The central propeller 11 is directly connected to the shaft of the engine 8.

In accordance with the present invention the three engines 8, 9, 10 are not arranged with their shafts in alinement in the median vertical plane of the machine, but each of the engines 9, 10, is directly coupled with its propeller 12, 13.

The construction of the landing carriage or chassis as illustrated in Figs. 4, 5, 6, 10 and 11 is as follows:

Underneath each fuselage is connected a curved or bent depending member or bracket 51 made of wood and shaped as shown in side elevation in Fig. 4.

Said bracket 51 has its ends connected to longitudinal frames 49, 50 of the front body.

On the lower part of said curved bracket 51 is mounted the axle 52 of a pair of duplex wheels 14, the bracket 51 being connected with the central portion of the axle 52 by means of an elastic cable or band 53 of any suitable elastic material but preferably of caoutchouc; two rods 54, 55 connect the axle with collar 56 fixed to the front of bracket 51 as shown in Fig. 5.

The connection between the rods 54, 55 and the collar 56, is effected by a yoke 57, the ends of said rods being hinged to the ends of the yoke. In the middle of the yoke 57 is a spherical enlargement which rests in a flanged spherical seating formed on the collar 56 and is held therein by a cap 58 fitting over the spherical enlargement and fixed by screws to the flanged seating.

The brackets 51 are further kept vertical by means of stays 59 attached at one end to the front frame of the flying machine.

At the forward end of the frame is mounted a further pair of wheels 15 and these complete the landing carriage or chassis.

Said front part of the carriage comprises a flat wooden bracket 60 curved at its lower end, and connected at its middle part to the frame of the carriage through a hinge joint 61.

The upper end of wooden bracket 60 is held to the carriage frame by means of an elastic band 62, while at the lower end of the wooden bracket 60 is carried the axle 63 which is connected therewith by means of an elastic band 64. The axle 63 which supports wheels 15 is maintained in horizontal position by stays 65, also hinged at 61 so that the bracket 60 and stays 65 can turn about the pivot of the hinge 61 against the pull of the elastic band 62 to reduce the shock on the front wheels when landing.

The manner in which the connecting struts or uprights 67 are connected to spars of the main planes is illustrated in Figs. 8 and 9.

Each connecting member 66 embraces the spar or frame 68 and is provided with three pairs of arms or lugs 69, 70, 71, as shown by Fig. 9, and each pair of arms is formed with connecting holes 72, 73, 74. In the holes 73 of arms 70 which form a socket are fitted the uprights 67, while the holes of the arms or lugs 69, 71, with holes 73, 74 form connecting loops for the wire stays of the frame.

What I claim and desire to secure by Letters Patent is:—

1. An aeroplane flying machine comprising a plurality of superposed main lifting planes, a main transverse front frame connecting said main lifting planes, a plurality of fuselages connected at their forward ends with the main frame and symmetrically disposed on opposite sides of the center line of the machine, rear stabilizing means connected with the rear ends of the fuselages, steering and controlling means, a body or nacelle disposed in the main transverse front frame between the fuselages, a motor mounted in the forward end of each fuselage, a plurality of tractor propellers driven directly by said motors, a third motor and propeller mounted on the body or nacelle, and a landing chassis or carriage.

2. An aeroplane flying machine comprising a plurality of superposed main lifting planes, a main transverse front frame connecting said main lifting planes and including the main plane spars, connecting struts or uprights between the spars, wire stays disposed crosswise between the struts and connecting members arranged to embrace the spars and each having three pairs of arms or lugs with holes for the connection thereto of the struts and stays, a plurality of fuselages connected at their forward ends with the main frame and symmetrically disposed on opposite sides of the center line of the machine, rear stabilizing means connected with the rear ends of the fuselages, steering and controlling means, a body or nacelle disposed in the main transverse front frame between the fuselages, a motor mounted in the forward end of each fuselage, a plurality of tractor propellers driven directly by said motors, a third motor and propeller mounted on the body or nacelle, and a landing chassis or carriage.

3. An aeroplane flying machine comprising a plurality of superposed main lifting planes, a main transverse front frame connecting said main lifting planes, a plurality of fuselages connected at their forward ends with the main frame and symmetrically disposed on opposite sides of the center line of the machine, rear stabilizing means connected with the rear ends of the fuselages, steering and controlling means, a body or nacelle disposed in the main transverse front frame between the fuselages, a motor mounted in the forward end of each fuselage, a plurality of tractor propellers driven directly by said motors, a third motor and propeller mounted on the body or nacelle, and a landing chassis or carriage, including leading and trailing wheels mounted on axles, flat wooden bent or curved brackets fixed to the main frame and forming supports for the axles of the trailing wheels, means for resiliently lashing the said axles to their supports and a curved bracket hingedly connected at a point between its ends to the main frame and secured at opposite ends by rubber lashings to the main frame and leading wheel of the chassis.

In testimony whereof, I affix my signature in the presence of witnesses.

ING. GIANNI CAPRONI.

Witnesses:
 ORESTE P. CAIRO,
 GIANNI GUACOMO GUARINI,
 L. R. ARROYO.